United States Patent [19]
Kodaira et al.

[11] Patent Number: 6,166,802
[45] Date of Patent: Dec. 26, 2000

[54] BEAM DETECTOR

[75] Inventors: Jun-ichi Kodaira; Takaaki Yamazaki, both of Tokyo, Japan

[73] Assignee: Kabushiki Kaisha Topcon, Tokyo, Japan

[21] Appl. No.: 09/139,719

[22] Filed: Aug. 25, 1998

[30]   Foreign Application Priority Data

Aug. 25, 1997 [JP] Japan .................................. 9-228058

[51] Int. Cl.[7] .............................. G01C 3/08; G01C 15/06; G01B 11/00
[52] U.S. Cl. ............................. 356/4.08; 33/293; 356/400
[58] Field of Search ................................. 356/4.08, 400, 356/401; 33/293

[56]   References Cited

U.S. PATENT DOCUMENTS

| | | |
|---|---|---|
| 4,023,908 | 5/1977 | Johnson et al. . |
| 4,029,415 | 6/1977 | Johnson . |
| 4,030,832 | 6/1977 | Rando et al. . |
| 4,732,471 | 3/1988 | Cain et al. . |
| 5,894,344 | 4/1999 | Tamez et al. ......................... 356/4.08 |

*Primary Examiner*—Stephen C. Buczinski
*Attorney, Agent, or Firm*—Jacobson, Price, Holman & Stern, PLLC

[57]   ABSTRACT

A reference beam detector according to the invention can be used to accurately and efficiently perform a level shifting operation by means of a reference beam and effectively eliminate the use of markers and other devices that are structurally simple but entail cumbersome operations and also the use of a level shifter. The beam detector comprises a detector main body having a beam receiving section for detecting an emitted laser beam, a display section for displaying the position of receiving the emitted beam relative to the reference position of the beam receiving section and a slidable index section having an index for indicating the position relative to the reference position.

7 Claims, 10 Drawing Sheets

BEAM DETECTOR

BACKGROUND OF THE INVENTION

1. Field of the Invention

This invention relates to a reference beam detector that can easily detect a rotary laser projecting apparatus such as a laser level or some other laser projecting apparatus.

2. Prior Art

Laser projecting apparatus, rotary laser projecting apparatus in particular, are widely used to provide a reference level in the field of civil engineering and building. A rotary laser projecting apparatus is used to provide a reference plane or a reference level by emitting a laser beam that rotates horizontally. When a rotary laser projecting apparatus is made to emit a laser beam vertically, a horizontal reference position can be determined by the plane defined by the laser beam.

A rotary laser projecting apparatus is mostly used in combination with a beam detector in actual applications including those for leveling the foundation in house building operations, those for leveling window frames and plugs in interior works and those for leveling the ground in civil engineering construction works.

On the site of using a rotary laser projecting apparatus for a construction work, it is normally placed on a tripod and regulated to emit a laser beam always on an imaginary horizontal plane. As shown in FIG. 11 of the accompanying drawings, a beam detector 10 comprises a detector main body 12 for receiving a reference beam and an index unit 14 rigidly secured to a lateral side of the detector main body.

When using such a rotary laser projecting apparatus and a beam detector 10, the laser beam emitted from the rotary laser projecting apparatus that is supported at a predetermined level by a tripod is received by the laser beam detector 10 that is typically arranged on a wall to define a reference point, which is marked on the wall by means of the index unit 14 and a pencil. Then, positions necessary for the construction work are marked by way of the reference point; for example, a point 3 cm above the reference point, a point 20 cm below the reference point and so on. A measure and a marker are normally used for marking a position by referring to the reference point.

The height of the tripod may often have to be modified in order to make the rotary laser projecting apparatus get to a predetermined level.

The operation of modifying the height of the tripod can be performed efficiently when the tripod is equipped with a level shifter.

While a tripod equipped with a level shifter operates relatively reliably for shifting the level of the rotary laser projecting apparatus supported by the tripod, a finely regulating operation will normally have to be conducted on it after shifting the level of the rotary laser projecting apparatus. Additionally, a tripod provided with a level shifter is rather costly.

The operation of modifying the height of a tripod in fact consists in redoing the operation of setting up the tripod. After completing the operation of modifying the height of the tripod, a finely regulating operation will have to be conducted once again. Thus, a given series of operations have to be repeated each time the height of the tripod is modified regardless if the tripod is equipped with a level shifter or not. Therefore, the operation of modifying the height of a tripod is cumbersome, inaccurate and inefficient.

While the use of a marker may be convenient for marking positions located close by relative to each other, a number of markers will have to be provided for marking remote positions. Additionally, the operation of marking remote positions is time consuming and costly.

In view of the above identified problems of known reference beam detectors, therefore, it is an object of the present invention to provide a reference beam detector that can be used to accurately and efficiently perform a level shifting operation. Another object of the present invention is to provide a beam detector that can effectively eliminate the use of markers and other devices that are structurally simple but entail cumbersome operations and also the use of a level shifter.

SUMMARY OF THE INVENTION

According to an aspect of the invention, the above objects and other objects are achieved by providing a beam detector comprising a detector main body having a beam receiving section for detecting an emitted laser beam, a display section for displaying the position of receiving the emitted beam relative to the reference position of the beam receiving section and a slidable index section having an index for indicating the position relative to the reference position. Preferably, the index section is removably fitted to the detector main body. Preferably, the index is a notch.

According to another aspect of the invention, there is also provided a beam detector comprising a detector main body having a beam receiving section for detecting an emitted laser beam, a display section for displaying the position of receiving the emitted beam relative to the reference position of the beam receiving section, a slidable index section having an index for indicating the position relative to the reference position and a detecting means for detecting the slid position of said index section. Preferably, the beam detector is moved to make the position displayed by the display section agree with the slid position of the index section detected by the detecting means. Preferably, the slid position detected by the detecting means is numerically displayed on the display section. Alternatively, the beam detector is moved to make the reference position of the beam receiving section agree with the slid position of the index section. Still preferably, the beam detector is provided with a scale for indicating the slid position of the index section relative to said reference position. Still preferably, said index is a notch.

DETAILED DESCRIPTION OF THE PREFERRED EMBODIMENTS

Now, the present invention will be described in greater detail by referring to the accompanying drawings that illustrate preferred embodiments of the invention.

1st Embodiment

Figure 1:
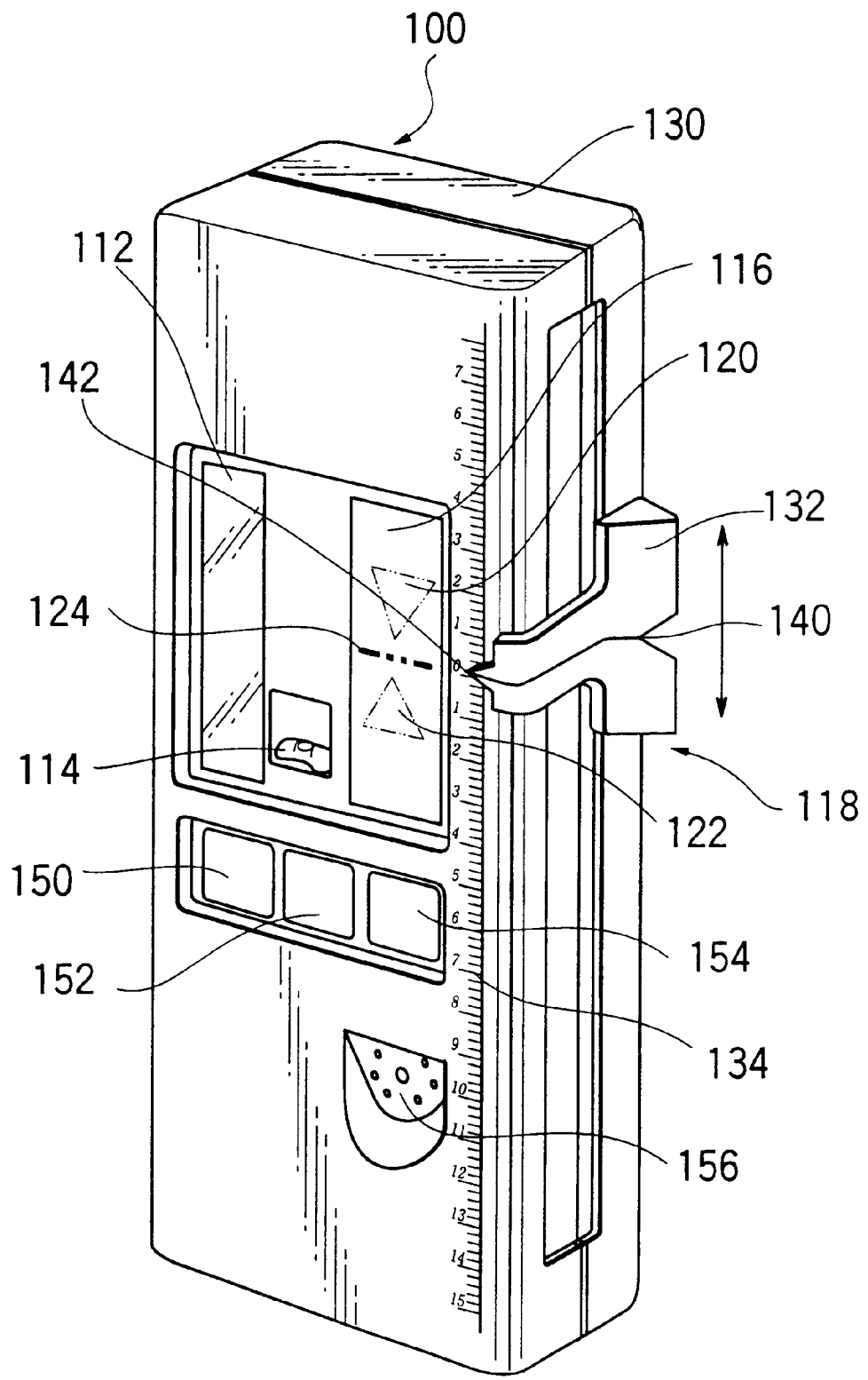
FIG. 1 is a schematic perspective view of a first embodiment of beam detector for selecting a reference position according to the invention.
Figure 2:
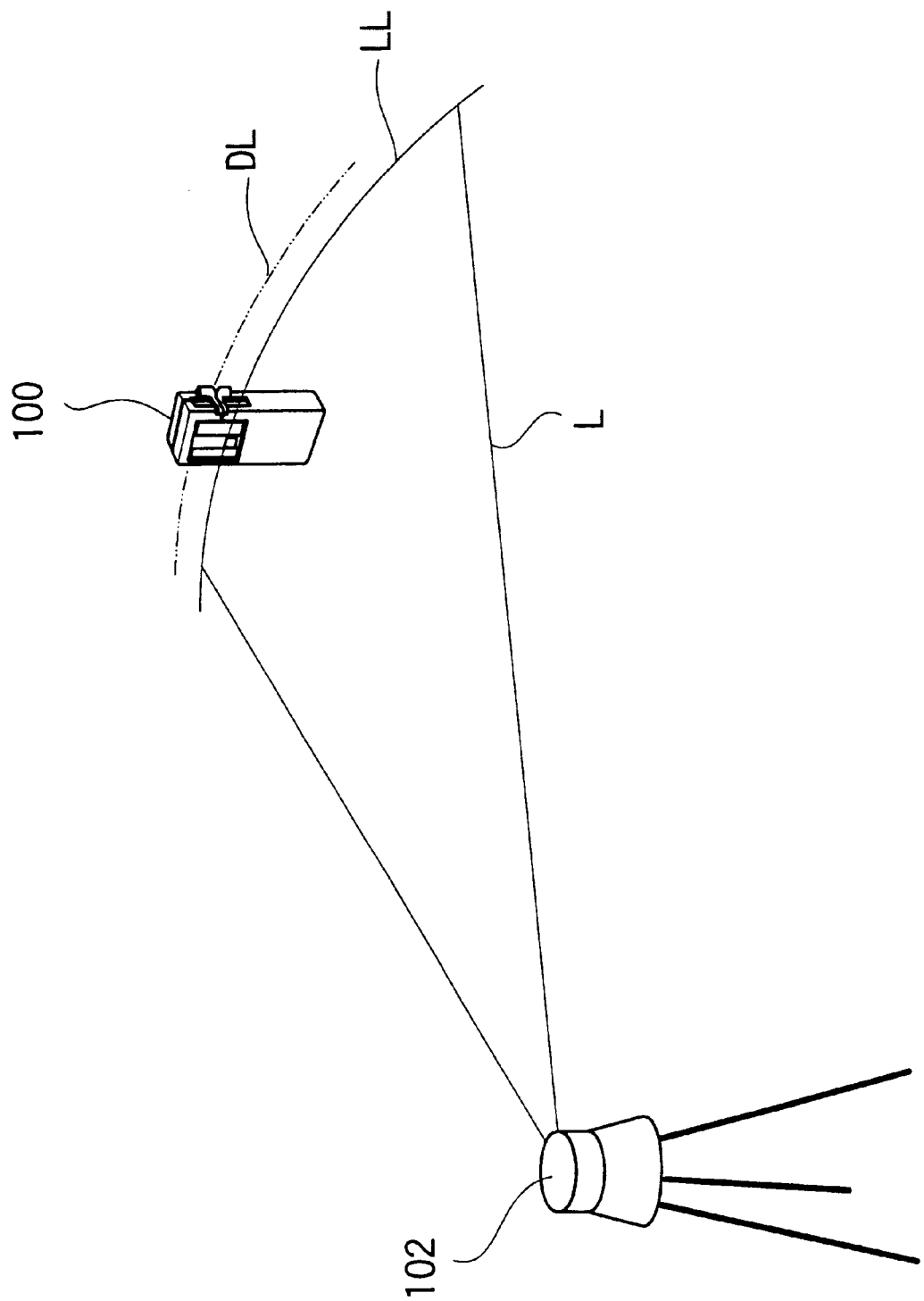
FIG. 2 is a schematic illustration of the use of the first embodiment for selecting a reference position.

Referring to FIG. 2, the first embodiment of beam detector 100 is used in combination with a rotary laser projecting apparatus 102 for defining a horizontal reference plane by horizontally emitting a laser beam L around a center located on a predetermined vertical axis. Said beam detector 100 is typically arranged on a wall (not shown) located within the reachable range of the laser beam L. In FIG. 2, reference symbol LL denotes the track of the laser beam L on the wall and reference symbol DL denotes a reference line to be selected that is separated from the track LL by a predetermined distance. As shown in FIG. 1, said embodiment of beam detector 100 comprises a vertically arranged beam receiving section 112, a bubble tube 114 for selecting a horizontal posture and an index section 118 for indicating the shift of the beam receiving element 112 from a reference position.

The beam receiving section 112 has a beam receiving element that is divided into an upper portion and a lower portion. A reference position is selected when the laser beam L emitted from the rotary laser projecting apparatus scans along the line separating the upper portion and the lower portion of the beam receiving element of the beam receiving section 112. When the laser beam L scans the upper portion of the light receiving element (not shown) of the beam receiving section 112, the upward indictor 122 of the display section 116 is highlighted to prompt an upward movement of the main body in order to correctly select a reference position. Similarly, when the laser beam L scans the lower portion of the light receiving element (not shown) of the beam receiving section 112, the downward indicator 120 of the beam receiving section 116 is highlighted to prompt a downward movement of the main body in order to correctly select a reference position.

A reference position can be selected highly accurately when the beam receiving section 112 comprises a position sensor such as a CCD or a light receiving element having a specifically designed profile. In any case, the reference position is detected when a predetermined position of the light receiving element is scanned by the laser beam L.

The index section 118 comprises a cursor 132 slidable relative to the main body of the beam detector 110 and a scale 134 for indicating the amount of the sliding motion of the cursor 132. The cursor 132 has a notch 140 for indicating the current position of the cursor 132 and a cursor pointer 142 arranged in correspondence to the notch 140 in order to indicate the current position of the cursor 132 on the scale 134.

The beam detector 100 additionally comprises a power switch 150, a detection accuracy regulating button 152, an alarm buzzer on/off switch button 154 and an alarm buzzer 156.

The main body of the beam detector 100 having the above described configuration is then moved up and down on the wall (not shown) to make the laser beam L scan the reference position (not shown) of the light receiving element 112. The indicator 122 is highlighted to prompt an upward movement of the apparatus main body when the laser beam L scans the light receiving element 112 at a position above the reference position, whereas the indicator 120 is highlighted to prompt a downward movement of the apparatus main body when the laser beam L scans the light receiving element 112 at a position below the reference position. When the laser beam L scans the light receiving element 112 at the reference position, the reference position indicator 124 is highlighted to show that the apparatus main body is now at a right position. Subsequently, the cursor 132 is moved to determine the amount of the positional shift on the scale 134 and a mark is drawn on the wall by means of the notch 140. Alternatively, the amount of the positional shift may be selected in advance.

Figure 3:
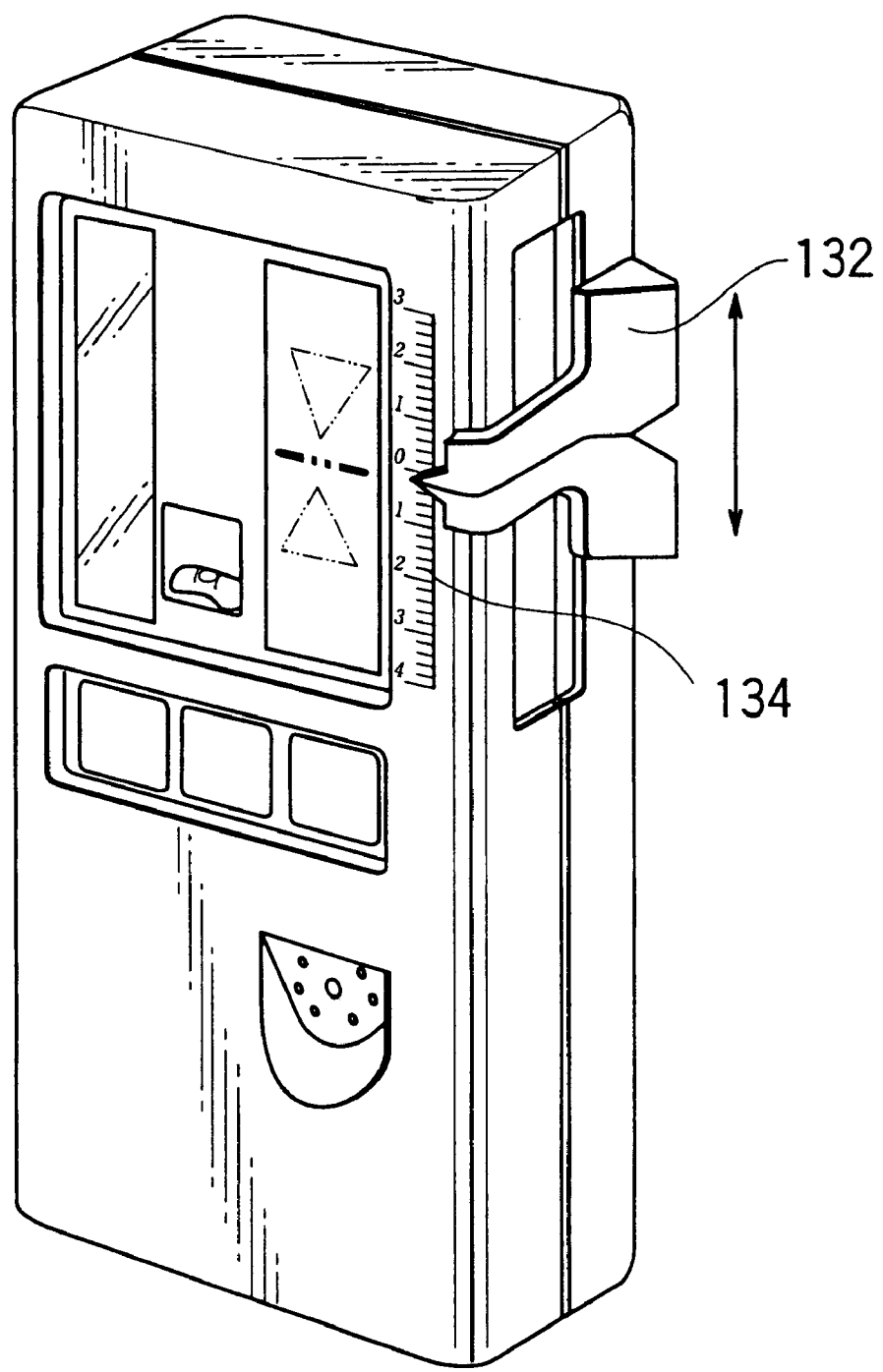
FIG. 3 is a schematic perspective view of an embodiment obtained by modifying the first embodiment of beam detector according to the invention.

FIG. 3 is a schematic perspective view of an embodiment obtained by modifying the first embodiment of beam detector according to the invention. In the modified embodiment of FIG. 3, the cursor 132 is allowed to move upward and downward by a same distance and it will be seen that the scale 134 is shorter than its counterpart of the first embodiment.

2nd Embodiment

Figure 4:
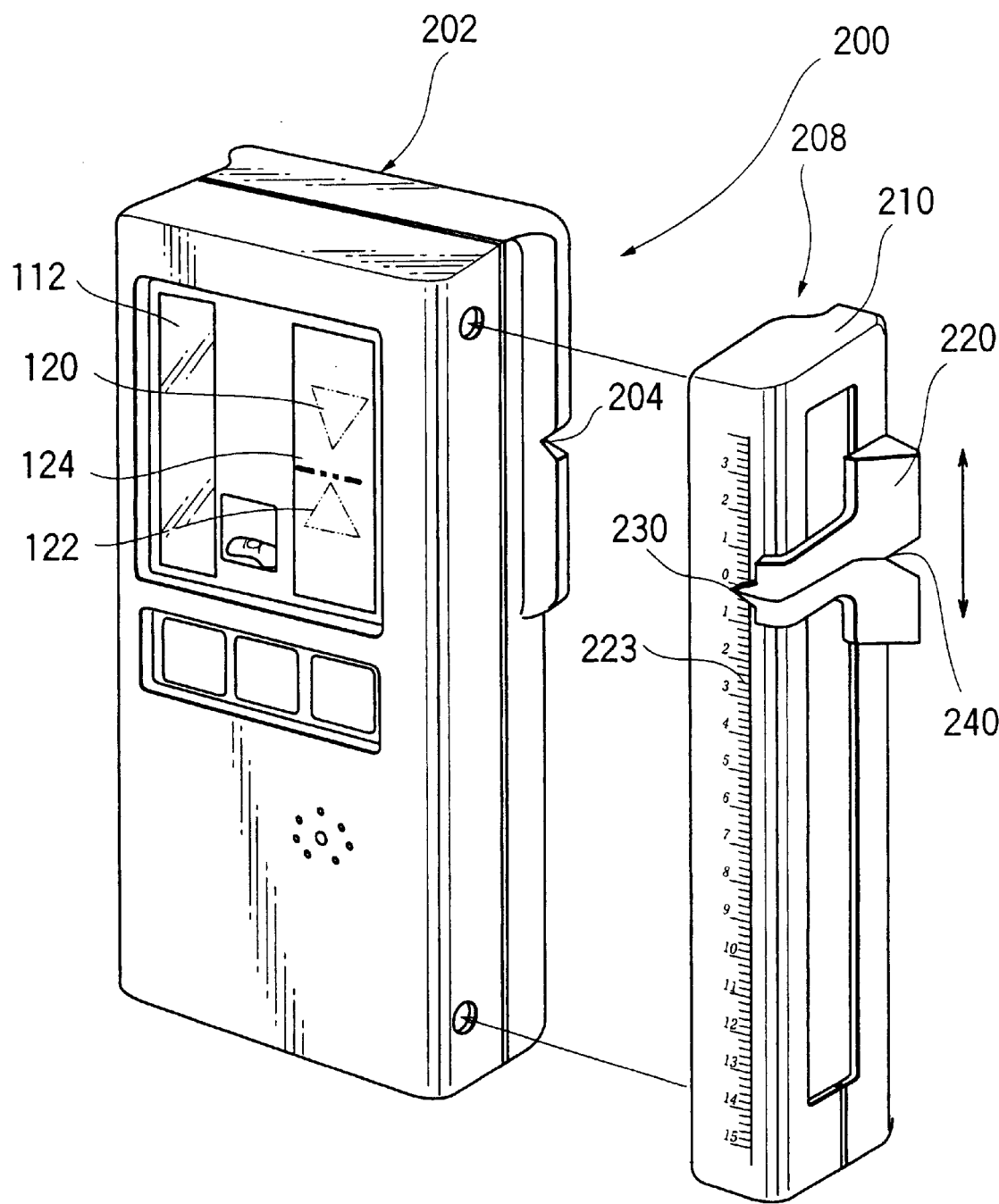
FIG. 4 is a schematic perspective view of a second embodiment of beam detector according to the invention.
Figure 11:
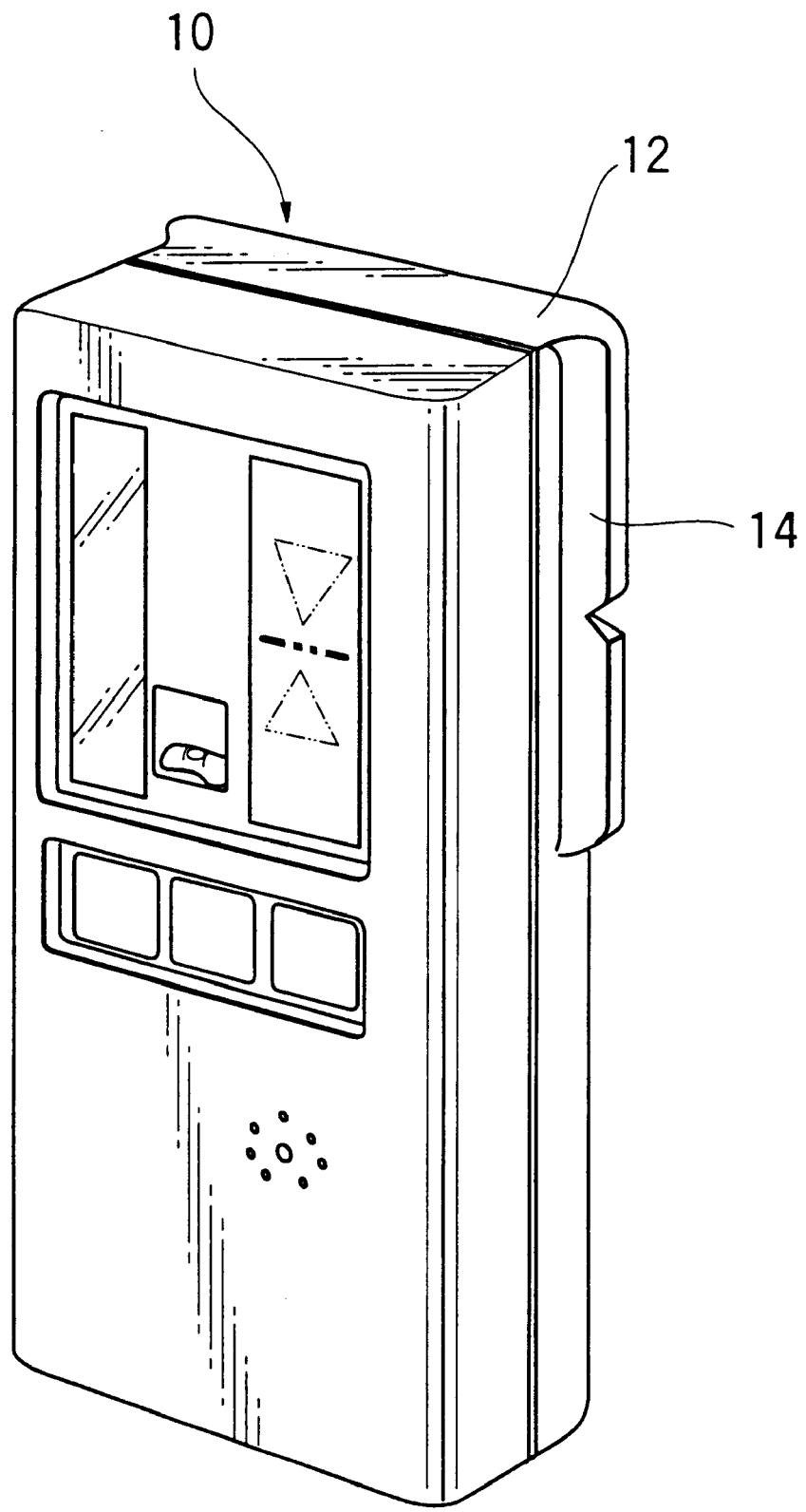
FIG. 11 is a schematic perspective view of a known comparable beam detector.

FIG. 4 is a schematic perspective view of the second embodiment of beam detector 200 for selecting a reference position according to the invention. The components that are same or similar to those of the first embodiments are denoted respectively by the same reference symbols and will not be described here any further. The beam detector 200 has a configuration substantially as that of the known beam detector shown in FIG. 11 and provided at a lateral side thereof with a notch 204 to be used for drawing a mark. A removable index means 208 is arranged on the side of the apparatus main body where the notch 204 is located. The index means 208 includes a cursor 220 slidable relative to a fitting section 210 rigidly secured to the apparatus main body and a scale 223 for indicating the amount of sliding movement of the cursor 220. The cursor 220 has a notch 204 for indicating the current position of the cursor 220 and a cursor pointer 230 arranged in correspondence to the notch 204 in order to indicate the current position of the cursor 220 on the scale 223.

3rd Embodiment

Figure 5:
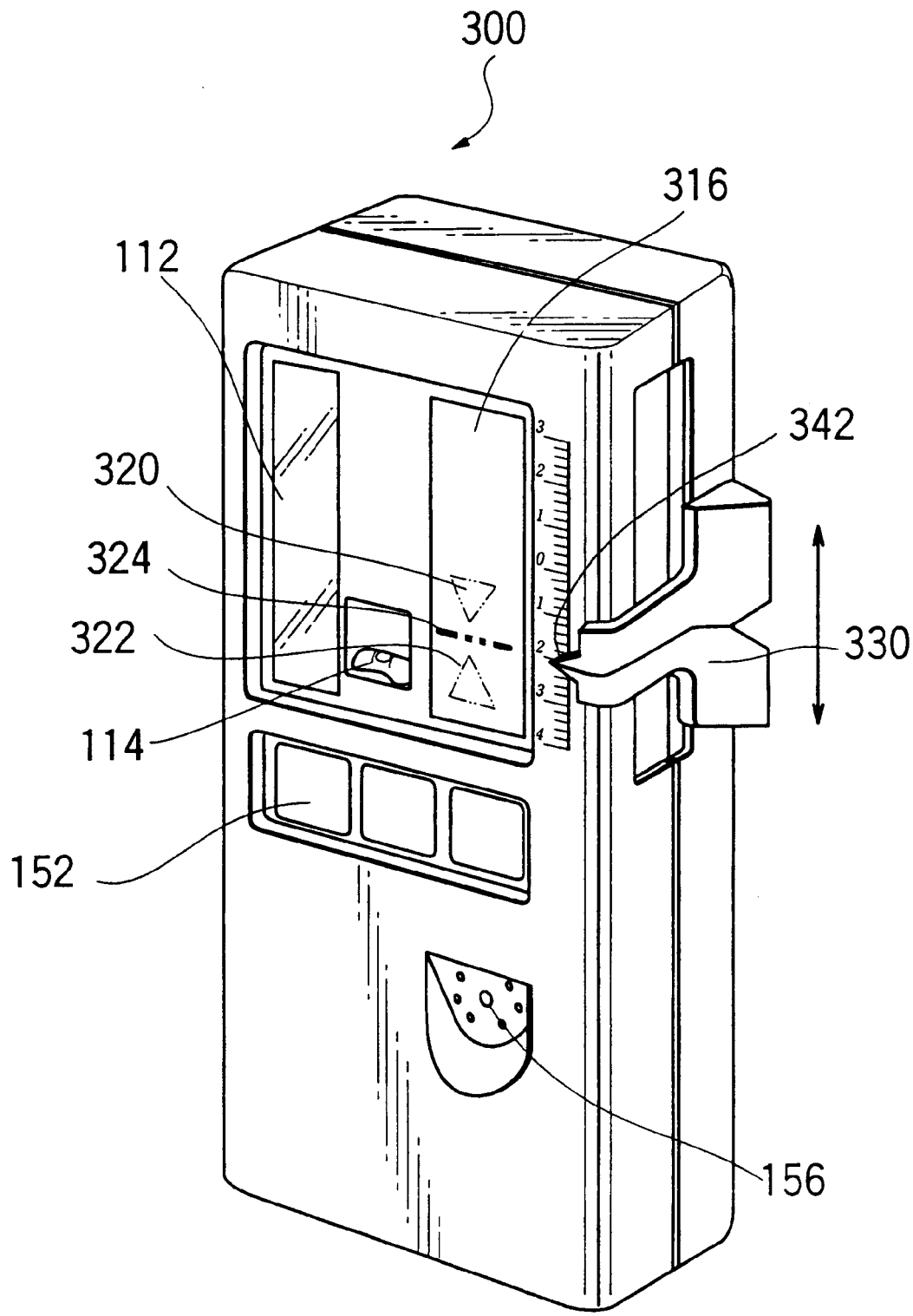
FIG. 5 is a schematic perspective view of a third embodiment of beam detector according to the invention.

FIG. 5 is a schematic perspective view of the third embodiment of beam detector 300 according to the invention. The components that are same or similar to those of the first embodiments are denoted respectively by the same reference symbols and will not be described here any further. The display section 316 of the beam detector 300 has a downward indicator 320, an upward indicator 322 and a reference position indicator 324 that are movable upward and downward in response to the movement of cursor 330. In other words, the position of the cursor pointer 342 of the cursor 330 always agrees with that of the reference position indicator 324. Therefore, the shifted position of the third embodiment of beam detector 300 can be visually confirmed with ease.

Figure 6:
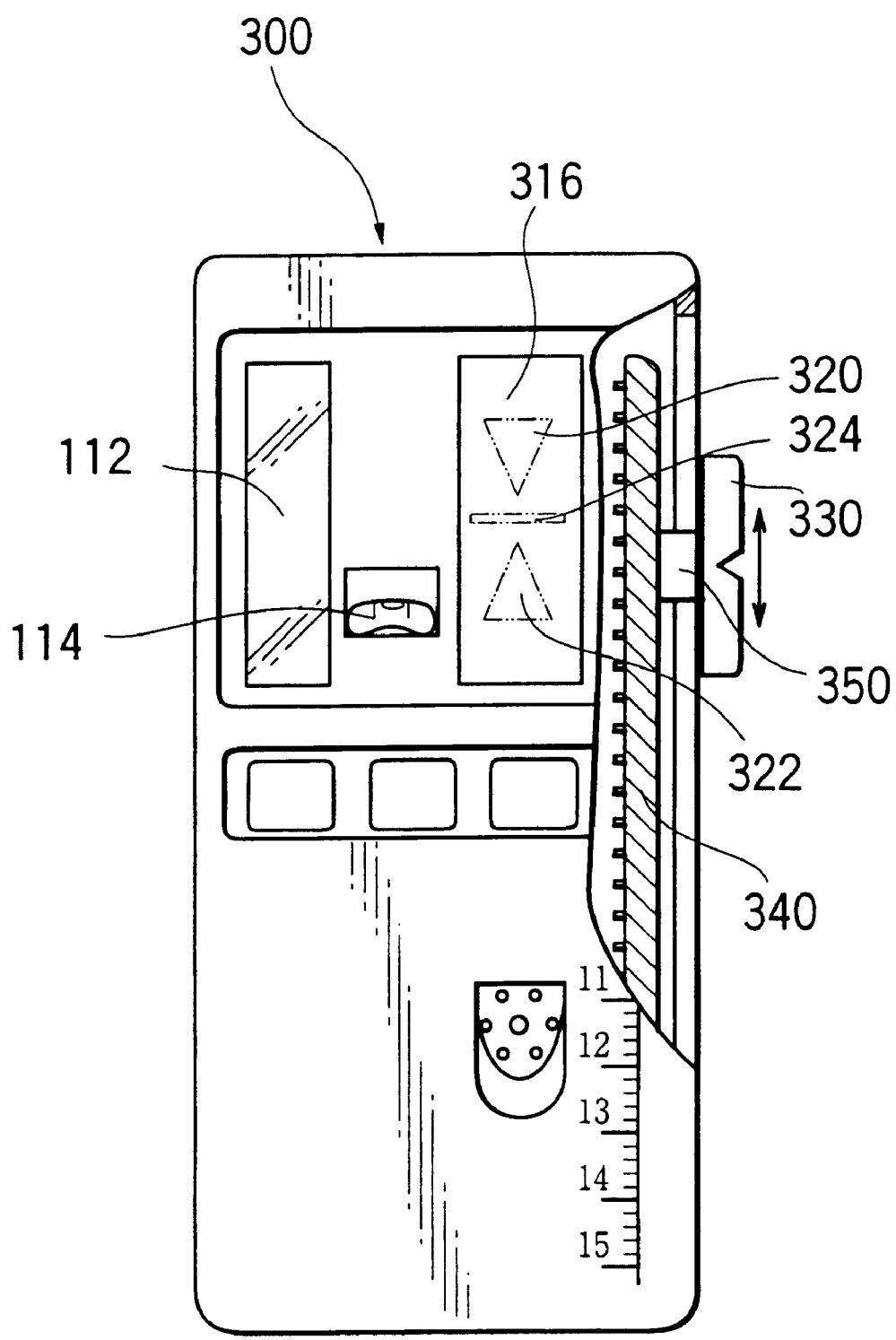
FIG. 6 is a partially cut away schematic front view of the third embodiment of beam detector according to the invention, illustrating the inside thereof.

FIG. 6 is a partially cut away schematic front view of the third embodiment of beam detector 300 according to the invention, illustrating the internal arrangement for detecting the position of the cursor 330. Referring to FIG. 6, a volume indicator 340 or a slide resistor is arranged in the inside and the sliding member (not shown) of the slide resistor is connected to the cursor 330. The output of the volume indicator 340 is connected to a computing circuit (not shown) to automatically detect the shifted position of the sliding member 350.

4th Embodiment

Figure 7:
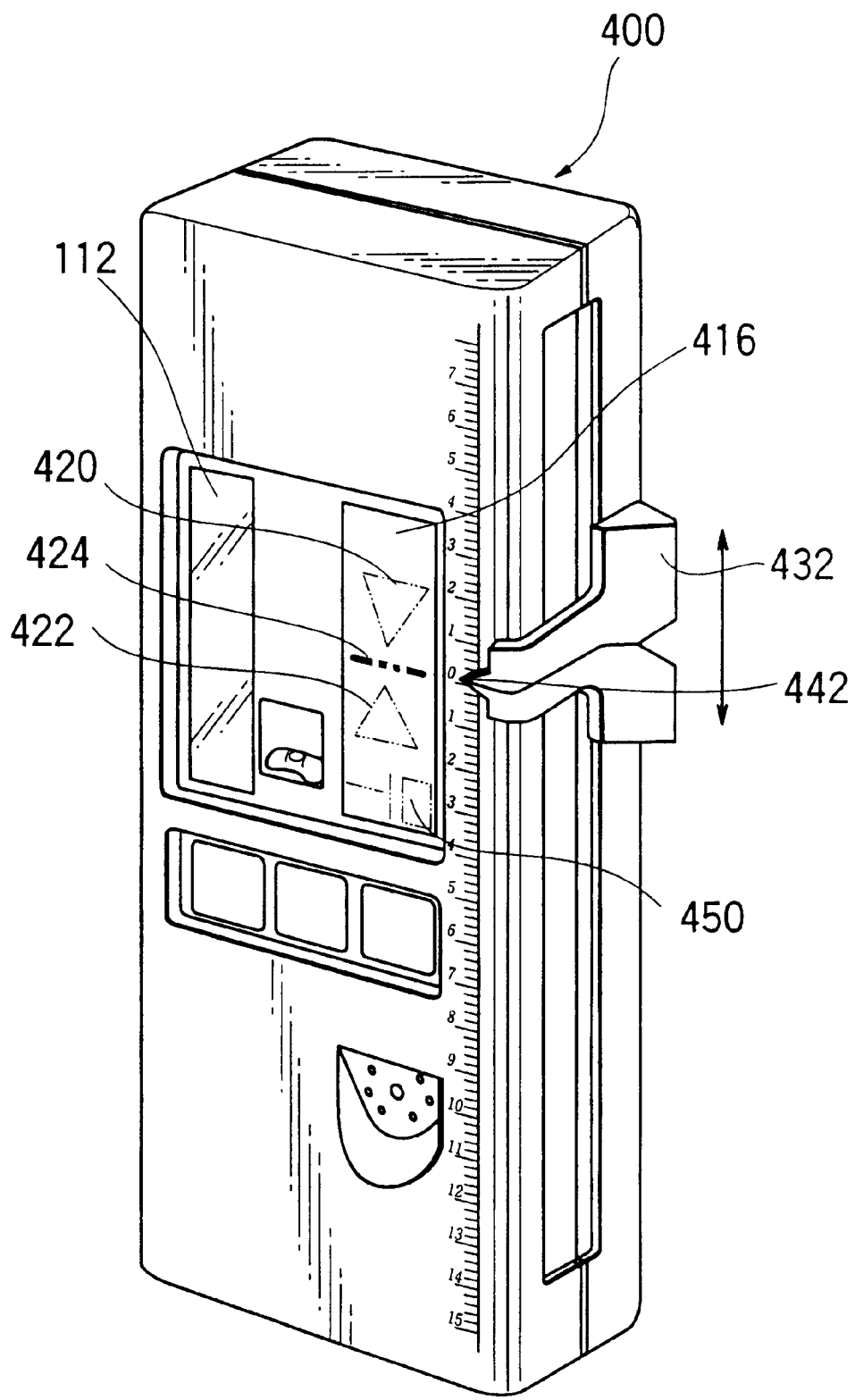
FIG. 7 is a schematic perspective view of a fourth embodiment of beam detector according to the invention.

FIG. 7 is a schematic perspective view of the third embodiment of beam detector 400 according to the invention. The components that are same or similar to those of the first embodiments are denoted respectively by the same reference symbols and will not be described here any further. While the position of the cursor pointer 342 of the cursor 330 always agrees with that of the reference position indicator 324 in the third embodiment, the reference position indicator 424 of the display section 416 of the beam detector 400 of the fourth embodiment is immobile but the amount of positional shift of the cursor pointer 442 is numerically displayed by a numerical display 450 located at a lower position of the display section 416.

The fourth embodiment of beam detector 400 has an advantage that the display section 416 can display any amount of positional shift of the cursor 432 regardless if it exceeds the length of the display section 416 or not.

5th Embodiment

Figure 8:
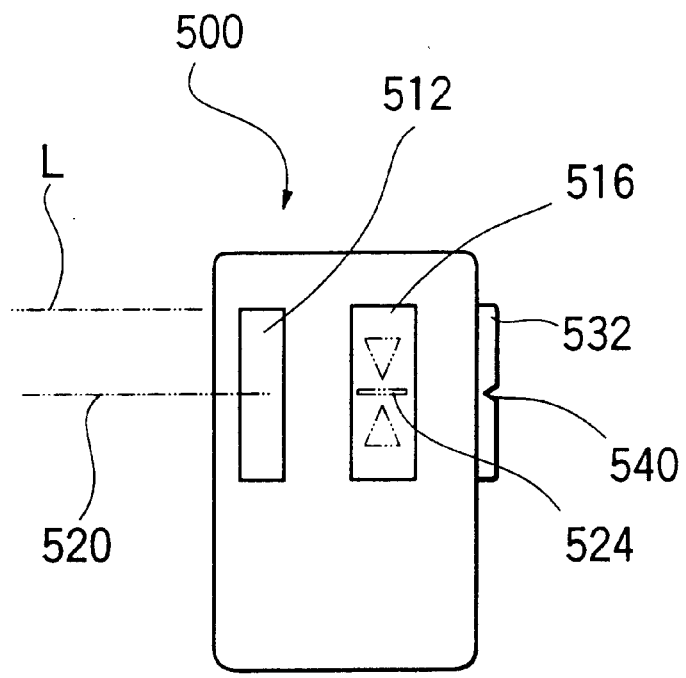
FIG. 8 is a schematic front view of a fifth embodiment of beam detector according to the invention, illustrating a state where the reference position is not shifted.
Figure 9:
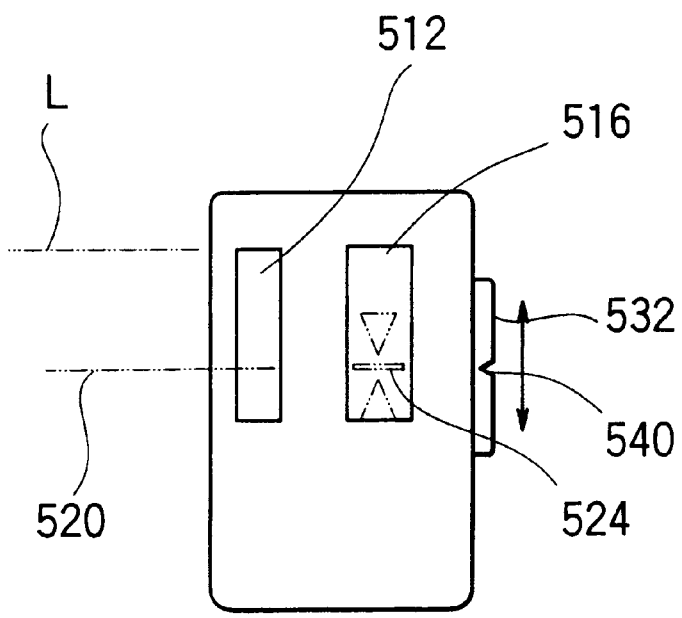
FIG. 9 is a schematic front view of the fifth embodiment of beam detector according to the invention, illustrating a state where the reference position is shifted.

FIG. 8 is a schematic perspective view of the third embodiment of beam detector 500 according to the invention. As seen from FIG. 8, the reference position 520 of the beam receiving section 512 of this embodiment is movable but always agree with the position of the notch 540 of the cursor 532. Thus, by shifting the reference position of the beam receiving section 512 upward or downward, the detectable range for detecting the reference beam can be increased on the side opposite to the side where the reference position is moved as seen from FIG. 9. With the fifth embodiment of beam detector 500, the detectable range for detecting the reference beam can be increased although the reference position 520, the reference position indicator 524 and the notch 540 positionally agree with each other.

Figure 10:
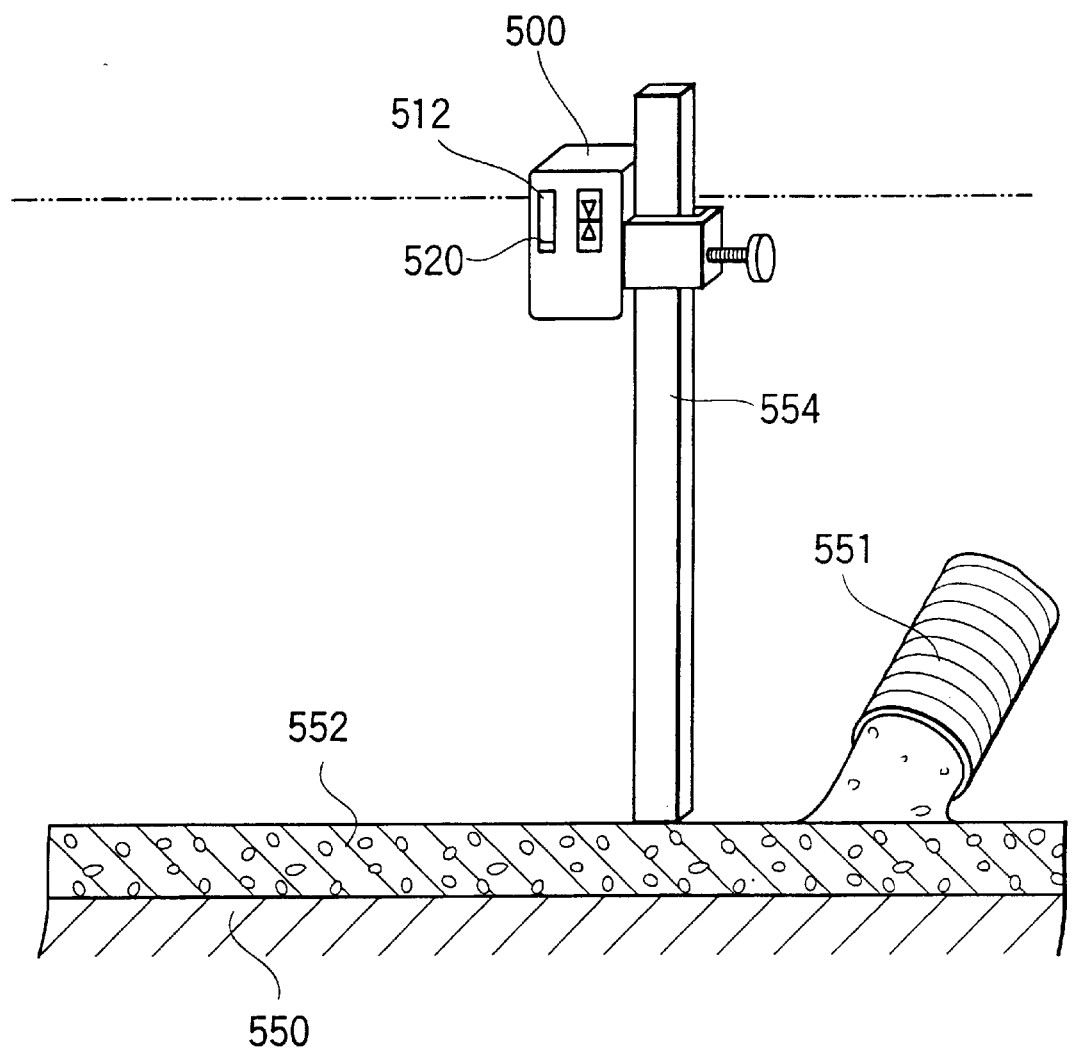
FIG. 10 is a schematic illustration of the use of the fifth embodiment of beam detector.

FIG. 10 shows how the embodiment is used for determining the height of the surface of a concrete layer 552 when concrete is fed onto the surface of a floor by way of a concrete feeding pipe 551. In FIG. 10, the embodiment of beam detector 500 is fitted to a marker rod 554 at a predetermined height and the lower end of the marker rod 554 is held in contact with the surface of the concrete layer 552. The reference position 520 of the beam detector 500 is located at the lowermost position of the beam receiving section 512. As the height of the concrete layer 552 rises, the beam detector 500 is raised so that the position of the beam receiving section 512 scanned by the laser beam L will be lowered gradually until the reference position 520 is hit by the laser beam and the reference position display displays the fact that the reference position 520 is hit, when the concrete laying operation will be terminated. It will be appreciated that this embodiment provides an upward detection range twice as large as that of the first embodiment of beam detector 100 for selecting a reference position.

Thus, a reference beam detector according to the invention can be used to accurately and efficiently perform a level shifting operation by means of a reference beam.

What is claimed is:

1. A beam detector for detecting a reference point established by a laser reference plane, said beam detector comprising a beam detector housing, a beam receiving section mounted in said housing for detecting a beam position and said beam receiving section having a predetermined zero position, a display section for displaying the beam position relative to said predetermined zero position indicator, said display section including an upward indicator, a downward indicator and a reference position indicator for indicating said predetermined zero position in order to adjust the housing up or down dependant upon activation of said upward indicator and said downward indicator by said beam position until the beam position is at the reference position indicator indicative of the predetermined zero position, a cursor slidably mounted on the housing for indicating the reference point and being movable in a perpendicular direction with respect to the laser reference plane on the detector housing, and a scale located on a side of said housing with said cursor being slidable along said scale for indicating shifted distance from the predetermined zero position to said reference point.

2. The beam detector according to claim 1, wherein the cursor and the scale are detachable from the detector housing.

3. A beam detector for detecting a reference point, said beam detector comprising a beam detector housing, a beam receiving section mounted in said housing for detecting a beam position and said beam receiving section having a zero position, a display section for displaying the beam position relative to said predetermined zero position indicator, said display section including an upward indicator, a downward indicator and a reference position indicator for indicating said predetermined zero position in order to adjust the housing up or down dependant upon activation of said upward indicator and said downward indicator by said beam position until the beam position is at the reference position indicator indicative of the predetermined zero position, a cursor slidably mounted on the housing for indicating the reference point and being movable in a perpendicular direction with respect to the laser reference plane on a detector housing, a scale located on a side of said housing with said cursor being slidable along said scale for indicating shifted distance from predetermined the zero position to the reference point, and a detecting device for detecting a shifted position of the cursor.

4. The beam detector according to claim 3, wherein the cursor and the scale are detachable from the detector housing.

5. The beam detector according to claim 3, wherein the display of the display section is moved in accordance with the output of the detecting device to make the beam position agree with the cursor.

6. The beam detector according to claim 3, wherein the beam receiving section is moved in accordance with the output of the detecting device to make the zero position agree with the cursor, and the scale indicates the shifted distance of the zero position.

7. The beam detector according to claim 3, wherein the shifted position of the cursor is numerically displayed on the display section.

\* \* \* \* \*